United States Patent
Ma et al.

(10) Patent No.: US 10,078,495 B2
(45) Date of Patent: Sep. 18, 2018

(54) METHOD AND APPARATUS FOR GENERATING SOURCE-INDEPENDENT QUANTUM RANDOM NUMBER

(71) Applicant: Tsinghua University, Beijing (CN)

(72) Inventors: Xiongfeng Ma, Beijing (CN); Xiao Yuan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 226 days.

(21) Appl. No.: 15/306,236

(22) PCT Filed: Aug. 27, 2015

(86) PCT No.: PCT/CN2015/088287
§ 371 (c)(1),
(2) Date: Oct. 24, 2016

(87) PCT Pub. No.: WO2016/034077
PCT Pub. Date: Mar. 10, 2016

(65) Prior Publication Data
US 2017/0046130 A1    Feb. 16, 2017

(30) Foreign Application Priority Data
Sep. 4, 2014  (CN) .......................... 2014 1 0449817

(51) Int. Cl.
G06F 7/58 (2006.01)
(52) U.S. Cl.
CPC .................................... G06F 7/588 (2013.01)
(58) Field of Classification Search
None
See application file for complete search history.

(56) References Cited

U.S. PATENT DOCUMENTS

| 6,539,410 B1 | 3/2003 | Klass |
| 2007/0127718 A1 | 6/2007 | Ribordy et al. |

(Continued)

FOREIGN PATENT DOCUMENTS

| CN | 1558581 A | 12/2004 |
| CN | 1232905 C | 12/2005 |

(Continued)

OTHER PUBLICATIONS

Yu, Study of random number generation based on quantum effects, Chinese Master's Theses Full-text Database Information Science and Technology (monthly), No. S1 Dec. 15, 2013.

(Continued)

*Primary Examiner* — Michael D. Yaary
(74) *Attorney, Agent, or Firm* — Hodgson Russ LLP

(57) ABSTRACT

A method and an apparatus for generating a source-independent quantum random number are disclosed. The method includes: receiving by a receiver a photon signal sent by a source and converting by the receiver a multi-photon signal contained in the photon signal into a single-photon signal equivalent to the multi-photon signal; modulating a single-photon signal in an X basis or a Z basis, and performing a projection measurement on the X basis or the Z basis randomly; calculating an error rate of the source according to a measurement result of the Z basis; obtaining a partially random binary string according to a measurement result of the X basis; and obtaining and processing a minimal entropy of the partially random binary string so as to obtain a completely random binary string.

10 Claims, 2 Drawing Sheets

(56) References Cited

U.S. PATENT DOCUMENTS

2012/0045053 A1* 2/2012 Qi .......................... G06F 7/588
380/252
2013/0022222 A1 1/2013 Zschau et al.
2013/0341487 A1* 12/2013 Zhai ......................... G01J 1/44
250/206

FOREIGN PATENT DOCUMENTS

| | | |
|---|---|---|
| CN | 101001141 A | 7/2007 |
| CN | 101198926 A | 6/2008 |
| CN | 101383661 A | 3/2009 |
| CN | 101473299 A | 7/2009 |
| CN | 101980146 A | 2/2011 |
| CN | 102508634 A | 6/2012 |
| CN | 103930866 A | 7/2014 |
| CN | 103942030 A | 7/2014 |
| CN | 104238996 A | 12/2014 |
| WO | 2006071269 A1 | 7/2006 |

OTHER PUBLICATIONS

SIPO, Office Action for CN application 201410449817.7 dated Sep. 9, 2016.
ISA/CN, International Search Report for PCT/CN2015/088287 dated Dec. 16, 2015.
ISA/CN, Written Opinon of the International Searching Authority for PCT/CN2015/088287 dated Dec. 16, 2015.

* cited by examiner

METHOD AND APPARATUS FOR GENERATING SOURCE-INDEPENDENT QUANTUM RANDOM NUMBER

CROSS REFERENCE TO RELATED APPLICATION

This application is a U.S. national phase application of International Application No. PCT/CN2015/088287, filed on Aug. 27, 2015, which claims priority to and benefits of Chinese Patent Application Serial No. 201410449817.7, titled "Method and Apparatus for generating source-independent quantum random number", filed with State Intellectual Property Office, P. R. C. on Sep. 4, 2014 by Tsinghua University, the entire content of which application is incorporated herein by reference.

FIELD

The present disclosure relates to the technology field of random number generation, more particularly to a method and apparatus for generating a source-independent quantum random number.

BACKGROUND

In the modern information era, a random number plays an important role in various fields such as economy, science, national defense and industry manufacture. Specifically, it has a very important application in various aspects, such as statistic analysis, simulation in the fields of industry and science, cryptology and lottery industry in life. With the classical method, only a pseudo-random number can be generated. The pseudo-random number just seems like the random number, i.e., there is a tiny possibility to distinguish the pseudo-random number and the random number in a limited time under the existing scientific and technical level. However, the entropies thereof are different in nature. So, the pseudo-random number cannot be applied directly in many fields since absolute safety cannot be guaranteed in fields such as safe communication.

According to the randomness of classical physical process, for example the random number may be generated by using noise of an electronic element. Although such random number does not bring risk with the development of computation capacity, the randomness thereof is not guaranteed naturally.

According to the basic principle of quantum mechanics, a quantum random generator may generate a real random number. In the past decades, many solutions for the quantum random generator are proposed, for example a detection using single photon, quantum non-locality and vacuum fluctuation have been successfully experimentally demonstrated. Meanwhile, the commercial quantum random number generator, such as the ID-Quantique system has entered the market. However, it should be noted that, it is unavoidable that these quantum random number generators depends on an assumption of models and a demand on the performance of equipment.

In the numerous quantum random number generators, the one using the single photon detection method is simplest, which mainly includes two parts: source and measure device. In the quantum random number generator using the single photon detection, the source sends a quantum state in Z basis to a detector, and then the detector performs a measurement in an X basis. As described above, according to the basic principle of quantum mechanics, the result obtained by the detector is the real random number. However, if the source does not contain randomness (for example, the source sends an X basis state), the result obtained by the measurement is a constant string without any randomness. Thus, in the quantum random number generator using the single photon detection, the randomness of the source is very important.

However, in the actual application, it is hard to ensure that the source contains enough quantum randomness, such that the resultant random number cannot be guaranteed. At present, a real random number guaranteed by the quantum mechanics is mainly generated by directly using the known source to perform the quantum measurement. Specifically, there are two ways as follows.

Way 1: as described in the white paper of the ID-Quantique random number generator, an LED radiates single photons to a Beamsplitter, and then two single photon detectors detect the photons being transmitted or reflected, respectively. Since it is in nature a quantum effect to transmit or reflect a single photon, the real random number may be obtained.

Way 2: as described in a scientific research paper published by one of the applicants, the phase fluctuation in the laser with low lightness is converted into the light intensity fluctuation by PLC-MZI, and then the light intensity is detected by a light intensity detector and is converted into an 8-bit binary string by using ADC. If the laser is weak enough, there are more phase fluctuations than classic fluctuations for the quantum, such that the real random number may be generated.

In one of the above two ways, an assumption is made about the source. In way 1, it is required to assume that the source is a single photon source. In way 2, it is required to assume that the phase fluctuations of laser are actually about the quantum and more than the classic fluctuations, which may be used as an assumption of source. However, these assumptions of the source cannot be verified in actual applications, such that there may be a big loophole in the randomness of the resultant random number. And even though these assumptions of the source are tenable, it is hard to ensure that the source contains enough quantum randomness in actual applications and the resultant random number cannot be guaranteed.

SUMMARY

The present disclosure seeks to solve at least one of the problems existing in the related art to at least some extent.

Accordingly, an objective of the present disclosure is to provide a method for generating a source-independent quantum random number. The method may generate a real random number guaranteed by quantum mechanics without depending on an assumption of a source, so that a high channel loss is acceptable for the method, and the method has a high utility value.

Another objective of the present disclosure is to provide an apparatus for generating a source-independent quantum random number.

In order to achieve the above objectives, according to embodiments of a first aspect of the present disclosure, there is provided a method for generating a source-independent quantum random number. The method includes the following steps: receiving by a receiver a photon signal sent by a source and converting by the receiver a multi-photon signal contained in the photon signal into a single-photon signal equivalent thereto; modulating a single-photon signal in an X basis or a Z basis, and performing a projection measurement on the X basis or the Z basis randomly; calculating an error rate of the source according to a measurement result of the Z basis; obtaining a partially random binary string according to a measurement result of the X basis; and obtaining and processing a minimal entropy of the partially random binary string so as to obtain a completely random binary string.

With the method for generating a source-independent quantum random number according to embodiments of the present disclosure, any assumption is not made about the source (i.e. source-independent), and the original measurement device based on a fixed basis is replaced with a measurement device based on randomly changed bases, such that the accuracy of the source is guaranteed while obtaining the random number. Additionally, the high channel loss is acceptable for the method, such that the method has a high utility value.

Further, the method for generating a source-independent quantum random number according to above embodiment of the present disclosure may further have the following additional technical features.

In some embodiments, calculating an error rate of the source according to a measurement result of the Z basis further includes: determining whether each measurement result of the Z basis is 0; recording measurement results of the Z basis and calculating the error rate according to the measurement results of the Z basis, in which the error rate is a number obtained by dividing the number of all measurements by the number of the measurements with a result of 1.

In some embodiments, the source is an untrusted source.

In some embodiments, the receiver includes two single-photon detectors.

In some embodiments, in a legal measurement, the number of measurements of the Z basis is a constant irrelevant to the number of all measurements, such that a ratio of the number of the measurements of the Z basis to the number of measurements of the X basis tends to 0 if an output string is long enough.

According to embodiments of a second aspect of the present disclosure, there is provided an apparatus for generating a source-independent quantum random number. The apparatus includes: a source, configured to send a photon signal; a receiver configured to, receive the photon signal sent by the source, convert a multi-photon signal contained in the photon signal into a single-photon signal equivalent to the multi-photon signal, modulate a single-photon signal in an X basis or a Z basis, and perform a projection measurement on the X basis or the Z basis randomly; a processor configured to, calculate an error rate of the source according to a measurement result of the Z basis, obtain a partially random binary string according to a measurement result of the X basis, and obtain and process a minimal entropy of the partially random binary string so as to obtain a completely random binary string.

With the apparatus for generating a source-independent quantum random number according to embodiments of the present disclosure, any assumption is not made about the source (i.e. source-independent), and the original measurement device based on a fixed basis is replaced with a measurement device based on randomly changed bases, such that the accuracy of the source is guaranteed while obtaining the random number. Additionally, the high channel loss is acceptable for the system, such that the apparatus has a high utility value.

Further, the apparatus for generating a source-independent quantum random number according to above embodiment of the present disclosure may further have the following additional technical features.

In some embodiments, the processor is configured to, determine whether each measurement result of the Z basis is 0; record measurement results of the Z basis and calculate the error rate according to the measurement results of the Z basis, in which the error rate is a number obtained by dividing the number of all measurement by the number of the measurement with a result of 1.

In some embodiments, the source is an untrusted source.

In some embodiments, the receiver includes: a polarization modulator, configured to modulate the single-photon signal in the X basis or the Z basis; a polarization beam splitter, configured to project the single-photon signal with the X basis or the Z basis; and two single-photon detectors, configured to perform projection measurements on the X basis or the Z basis.

In some embodiments, in a legal measurement, the number of measurements of the Z basis is a constant irrelevant to the number of all measurements, such that a ratio of the number of the measurements of the Z basis to the number of measurements of the X basis tends to 0 if an output string is long enough.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
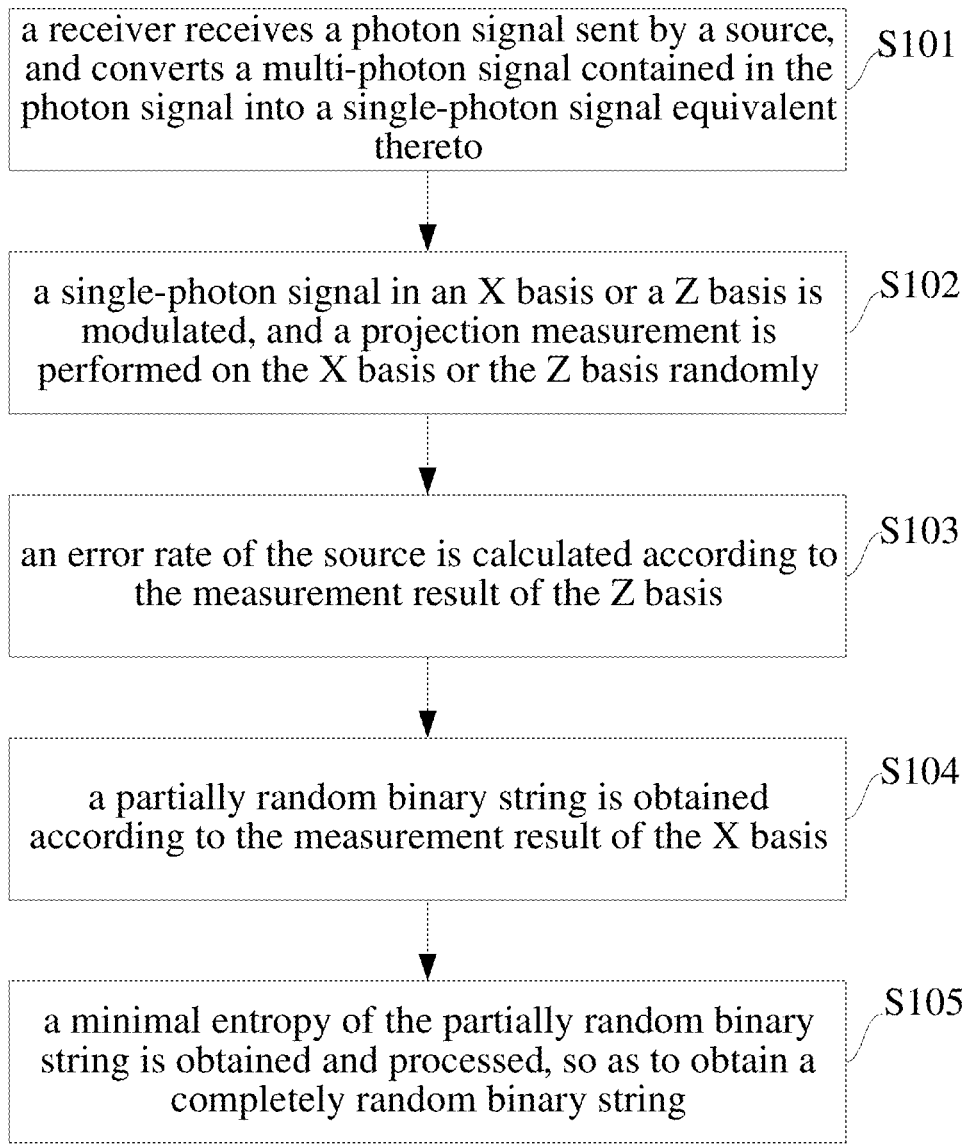
FIG. 1 is a flow chart of a method for generating a source-independent quantum random number according to an embodiment of the present disclosure.

Example embodiments will be described in detail herein, and examples thereof are illustrated in accompanying drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the following, the method and apparatus for generating a source-independent quantum random number according to embodiments of the present disclosure will be described with reference to the drawings.

FIG. 1 is a flow chart of a method for generating a source-independent quantum random number according to an embodiment of the present disclosure. As shown in FIG. 1, the method includes the following steps.

In step S101, a receiver receives a photon signal sent by a source, and converts a multi-photon signal contained in the photon signal into a single-photon signal equivalent thereto. In a specific embodiment, the photon signal sent by the source may contain a multi-photon signal and a single-photon signal. The receiver, for example, may convert the potential multi-photon signal into the single-photon signal equivalent thereto by using a threshold detector, so as to solve the problem that the source may send the multi-photon signal. In one embodiment of the present disclosure, the source is an untrusted source. The receiver, for example, includes two single-photon detectors, configured to modulate a single-photon signal in an X-basis or Z-basis.

In step S102, a single-photon signal in an X-basis or a Z-basis is modulated, and a projection measurement is performed on the X basis or the Z basis randomly.

In one embodiment of the present disclosure, in a legal measurement, the number of measurements of the Z basis is a constant irrelevant to the number of all measurements. Specifically, the receiver measures the X basis and the Z basis of the single-photon signal simultaneously. For the situation that both single-photon detectors of the receiver give no response, this is called an illegal measurement, which may be excluded by use of postselection. For the situation that both single-photon detectors give responses, if the Z basis is measured, the measurement result may be assigned as 1 or 0 randomly; if the X basis is measured, the measurement result is assigned as 0 directly. In other legal measurements, the receiver ensures that a ratio of the number of measurements of the Z basis to the number of measurements of the X basis tends to 0 when the output string is long enough. Specifically, the number of measurements of the Z basis is kept as the constant irrelevant to the number of all the measurements.

In step S103, an error rate of the source is calculated according to the measurement result of the Z basis. Specifically, it is determined whether the measurement result of the Z basis is 0, if yes, it is determined that the source obeys rules, i.e. the source is correct; or else, it is determined that the source does not obey rules, i.e. the source is incorrect. In a specific embodiment, an ideal source is assumed to send the positive eigen state of the Z basis forever. If it is true, the measurement result of measuring the Z basis by the receiver is definitely 0 (corresponding to the positive eigen state). Thus, in order to detect whether the source obeys the rules, the receiver may occasionally measure the Z basis, record the measurement result, and calculate the error rate denoted by $e_z$ according to the measurement result. In other words, if the measurement result of measuring the Z basis is 1, an error is recorded. The error rate is the number obtained by dividing the number of all measurement by the number of the measurement with a result of 1.

In step S104, a partially random binary string is obtained according to the measurement result of the X basis. Specifically, when the receiver measures the X basis, the partially random binary string may be obtained. Further, a minimal entropy is required for a more accurate randomness quantization so as to measure the randomness.

In step S105, a minimal entropy of the partially random binary string is obtained and processed, so as to obtain a completely random binary string. Specifically, after obtaining the partially random binary string, the minimal entropy of the partially random binary string is calculated, which is denoted by $1-H(e_z)$, and then a further process is performed to obtain the completely random binary string.

With the method for generating a source-independent quantum random number according to embodiments of the present disclosure, any assumption is not made about the source (i.e. source-independent), and the original measurement device based on a fixed basis is replaced with a measurement device based on randomly changed bases, such that the accuracy of the source is guaranteed while obtaining the random number. Additionally, the high channel loss is acceptable for the method, such that the method has a high utility value.

Embodiments of the present disclosure further provide an apparatus for generating a source-independent quantum random number.

Figure 2:
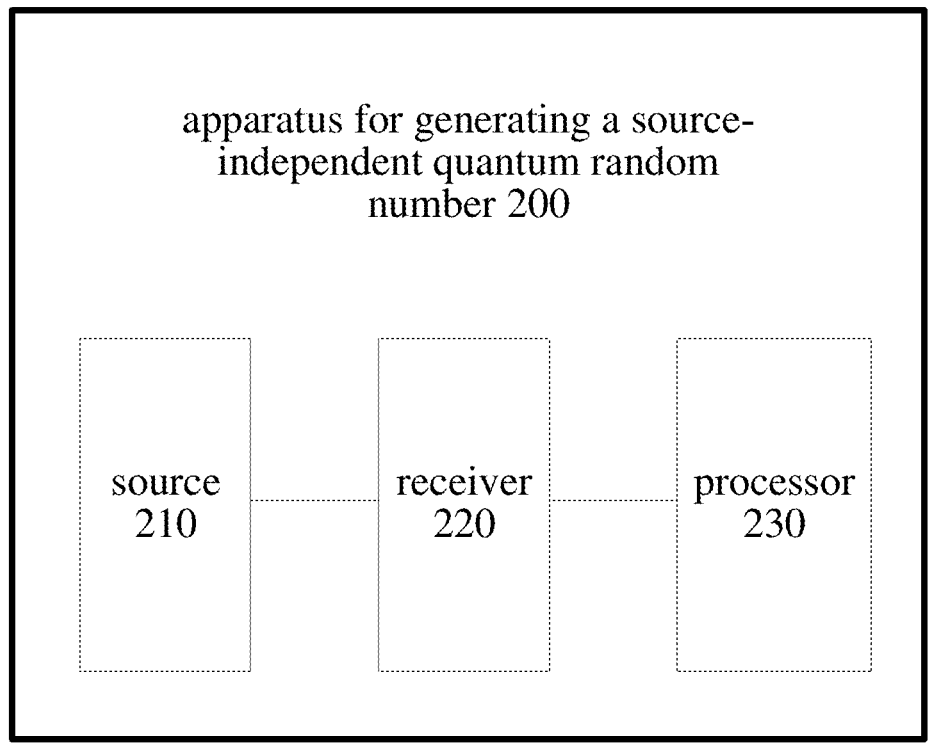
FIG. 2 is a block diagram of an apparatus for generating a source-independent quantum random number according to an embodiment of the present disclosure.

FIG. 2 is a block diagram of an apparatus for generating a source-independent quantum random number according to an embodiment of the present disclosure. As shown in FIG. 2, the apparatus includes: a source 210, a receiver 220 and a processor 230.

Specifically, the source 210 is configured to send a photon signal. In an embodiment of the present disclosure, the source 210 is an untrusted source.

The receiver 220 is configured to, receive the photon signal sent by the source 210, convert a multi-photon signal contained in the photon signal into a single-photon signal equivalent thereto, modulate a single-photon signal in an X basis or a Z basis, and perform a projection measurement on the X basis or the Z basis.

In a specific embodiment, the photon signal sent by the source 210 may include multi-photon signal and a single-photon signal. The receiver 220, for example, may convert the potential multi-photon signal into the single-photon signal equivalent thereto by using a threshold detector, such that the problem that the source 210 may send the multi-photon signal may be solved.

Figure 3:
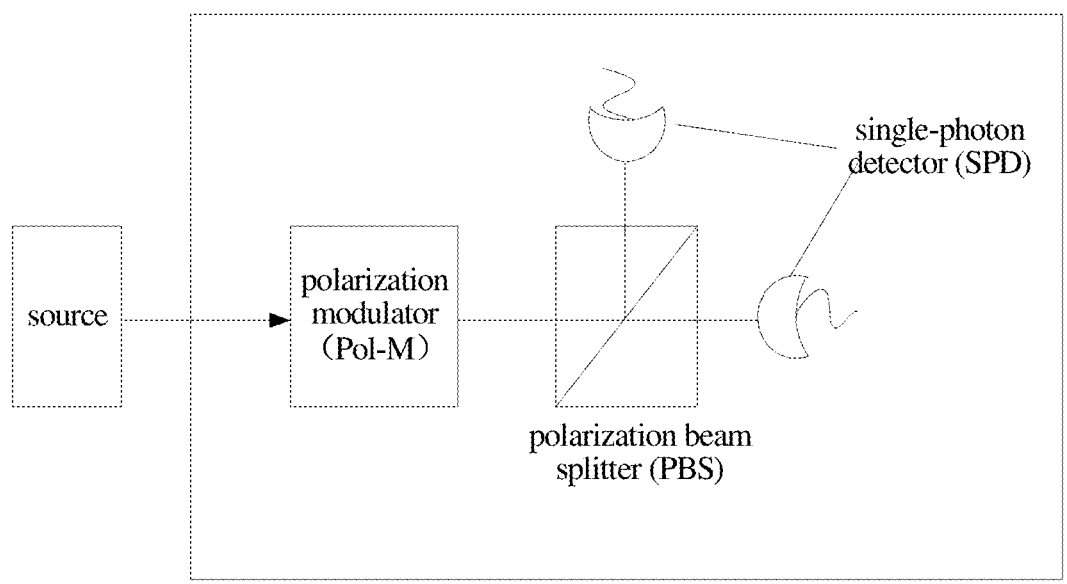
FIG. 3 is a schematic diagram of a receiver according to an example embodiment of the present disclosure.

As shown in FIG. 3, in some embodiments, the receiver 220 further includes a polarization modulator, a polarization beam splitter and two single-photon detectors. The polarization modulator is configured to modulate the single-photon signal in the X basis or the Z basis. The polarization beam splitter is configured to project the single-photon signal with the X basis or the Z basis. The two photon detectors are configured to perform projection measurements on the X basis or the Z basis.

In an embodiment of the present disclosure, in a legal measurement, the number of measurements of the Z basis is a constant irrelevant to the number of all the measurements. Specifically, the receiver 220 measures the Z basis and the X basis of the single-photon signal simultaneously. For the situation that both single-photon detectors in the receiver 220 give no response, it is called an illegal measurement, which may be excluded by use of postelection. For the situation that both single-photon detectors give responses, if the Z basis is measured, the measurement result may be assigned as 0 or 1 randomly; if the X basis is measured, the measurement result may be assigned as 0 directly. In the rest legal measurements, the receiver 220 ensures that a ratio of the number of measurements of the Z basis to the number of measurements of the X basis tends to 0 when the output string is long enough. More specifically, the number of measurements of the Z basis is kept as the constant irrelevant to the number of all the measurements.

The processor 230 calculates an error rate of the source 210 according to the measurement result of the Z basis, obtains a partially random binary string according to the measurement result of the X basis, obtains and processes a minimal entropy of the partially random binary string so as to obtain a completely random binary string.

Specifically, the processor 230 determines whether the measurement result of the Z basis is 0, and determines that the source 210 obeys rules (i.e., the source is correct) if the measurement result of the Z basis is 0, determines that the source 210 does not obey the rules (i.e., the source 210 is incorrect) if the measurement result of the Z basis is not 0.

In a specific embodiment, an ideal source is assumed to send the positive eigenstate of the Z basis forever. If it is true, the measurement result of measuring the Z basis is definitely 0 (corresponding to the positive eigen state). Thus, in order to detect whether the source 210 obeys the rules, the Z basis is measured occasionally and the measurement result is recorded. The processor 230 calculates the error rate denoted by $e_z$ of the source 210 according to the measurement result. In other words, if the measurement result of measuring the Z basis is 1, an error is recorded. The error rate is the number obtained by dividing the number of all measurement by the number of the measurement with a result of 1.

Additionally, when measuring the X basis, the partially random binary string may be obtained. Further, a minimal entropy is required for a more accurate randomness quantization, so as to measure the randomness. After obtaining the partially random binary string, the processor 230 calculates the minimal entropy of the partially random binary string, which is denoted by $1-H(e_z)$, and then a post-processing is performed to obtain the completely random binary string.

With the apparatus for generating a source-independent quantum random number according to embodiments of the present disclosure, any assumption is not made about the source (i.e. source-independent), and the original measurement device based on a fixed basis is replaced with a measurement device based on randomly changed bases, such that the accuracy of the source is guaranteed while obtaining the random number. Additionally, the high channel loss is acceptable for the system, such that the apparatus has a high utility value.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first is feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for generating a source-independent quantum random number, comprising:
    receiving by a receiver a photon signal sent by a source and converting by the receiver a multi-photon signal contained in the photon signal into a single-photon signal equivalent to the multi-photon signal;
    modulating a single-photon signal in an X basis or a Z basis, and performing a projection measurement on the X basis or the Z basis randomly;
    calculating an error rate of the source according to a measurement result of the Z basis;
    obtaining a partially random binary string according to a measurement result of the X basis; and
    obtaining and processing a minimal entropy of the partially random binary string so as to obtain a completely random binary string.

2. The method according to claim 1, wherein calculating an error rate of the source according to a measurement result of the Z basis comprises:
    determining whether each measurement result of the Z basis is 0;
    recording measurement results of the Z basis, and calculating the error rate according to the measurement results of the Z basis, wherein the error rate is a number obtained by dividing the number of all measurement by the number of the measurement with a result of 1.

3. The method according to claim 1, wherein the source is an untrusted source.

4. The method according to claim 1, wherein the receiver comprises two single-photon detectors.

5. The method according to claim 1, wherein in a legal measurement, the number of measurements of the Z basis is a constant irrelevant to the number of all measurements, such that a ratio of the number of the measurements of the Z basis to the number of measurements of the X basis tends to 0 if an output string is long enough.

6. An apparatus for generating a source-independent quantum random number, comprising:
   a source, configured to send a photon signal;
   a receiver configured to:
      receive the photon signal sent by the source, convert a multi-photon signal contained in the photon signal into a single-photon signal equivalent to the multi-photon signal, modulate a single-photon signal in an X basis or a Z basis, and perform a projection measurement on the X basis or the Z basis randomly;
   a processor configured to:
      calculate an error rate of the source according to a measurement result of the Z basis, obtain a partially random binary string according to a measurement result of the X basis, and obtain and process a minimal entropy of the partially random binary string so as to obtain a completely random binary string.

7. The apparatus according to claim 6, wherein the processor is configured to:
   determine whether each measurement result of the Z basis is 0;
   record measurement results of the Z basis, and calculate the error rate according to the measurements results of the Z basis; wherein the error rate is a number obtained by dividing the number of all measurement by the number of the measurement with a result of 1.

8. The apparatus according to claim 6, wherein the source is an untrusted source.

9. The apparatus according to claim 6, wherein the receiver comprises:
   a polarization modulator, configured to modulate the single-photon signal in the X basis or the Z basis;
   a polarization beam splitter, configured to project the single-photon signal with the X basis or the Z basis; and
   two single-photon detectors, configured to perform projection measurements on the X basis or the Z basis.

10. The apparatus according to claim 6, wherein in a legal measurement, the number of measurements of the Z basis is a constant irrelevant to the number of all measurements, such that a ratio of the number of the measurements of the Z basis to the number of measurements of the X basis tends to 0 if an output string is long enough.

* * * * *